(12) United States Patent
Nagashima et al.

(10) Patent No.: US 7,425,599 B2
(45) Date of Patent: Sep. 16, 2008

(54) POLYVINYL ETHERS HAVING SILICON-CONTAINING FUNCTIONAL GROUPS OR ATOMIC GROUPS AT THE END AND PROCESS FOR PRODUCTION THEREOF

(75) Inventors: Hideo Nagashima, Kasuga (JP); Kouki Matsubara, Kasuga (JP)

(73) Assignee: Japan Science and Technology Agency, Saitama (JP)

( * ) Notice: Subject to any disclaimer, the term of this patent is extended or adjusted under 35 U.S.C. 154(b) by 642 days.

(21) Appl. No.: 10/543,251

(22) PCT Filed: Jun. 10, 2003

(86) PCT No.: PCT/JP03/07309

§ 371 (c)(1),
(2), (4) Date: Jul. 22, 2005

(87) PCT Pub. No.: WO2004/069883

PCT Pub. Date: Aug. 19, 2004

(65) Prior Publication Data

US 2006/0142510 A1     Jun. 29, 2006

(30) Foreign Application Priority Data

Feb. 10, 2003 (JP) .............................. 2003-031998

(51) Int. Cl.
*C08F 30/08* (2006.01)
*C08F 4/80* (2006.01)

(52) U.S. Cl. .................. 526/171; 526/279; 526/332

(58) Field of Classification Search ............... 526/171, 526/279, 332
See application file for complete search history.

(56) References Cited

OTHER PUBLICATIONS

Crivello et al., J. Polym. Sci. A., 30 31-39 (1992).*

* cited by examiner

*Primary Examiner*—Robert D. Harlan
(74) *Attorney, Agent, or Firm*—Fay, Sharpe LLP

(57) ABSTRACT

Disclosed is a technology for the production of polyvinyl ethers having a reactive silicon-containing functional or atomic group at the terminal thereof. The polyvinyl ether as expressed by the formula (VII) is prepared by allowing, in the presence of a catalyst composed of a polynuclear ruthenium-carbonyl complex in which carbonyl groups coordinate with two to four ruthenium atoms, a vinylether compound expressed by the formula (III) to react with a silane compound expressed by the formula (IV). In the formulae, $R^1$, $R^2$ and $R^3$ each represents a hydrogen atom or a hydrocarbon group having 1 to 8 carbon atoms, $R^4$ represents an alkyl group, a cycloalkyl group, an aryl group, an aralkyl group, or a silyl group, and $X^1$, $X^2$ and $X^3$ each represents a hydrogen atom, a halogen atom, an amino group, an alkyl group, an alkoxy group, a thioalkyl group, an alkylamino group, an aryl group, an arylamino group, an aralkyl group a vinyl group, or a heterocyclic group.

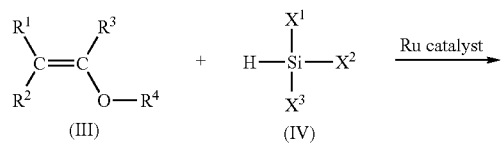 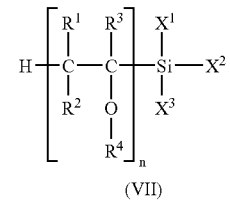
3 Claims, 4 Drawing Sheets

Ru₃(CO)₁₂  9

II $^1$H−NMR (Solvent : C$_6$D$_6$)

$^{13}$C−NMR (Solvent : C$_6$D$_6$)

US 7,425,599 B2

POLYVINYL ETHERS HAVING SILICON-CONTAINING FUNCTIONAL GROUPS OR ATOMIC GROUPS AT THE END AND PROCESS FOR PRODUCTION THEREOF

TECHNICAL FIELD

The present invention belongs to the technical field of polymeric materials, and particularly relates to polyvinyl ethers having a silicon-containing functional or atomic group at the terminal thereof and a method for producing the same.

BACKGROUND ART

Polyvinyl ethers are industrially important materials as they are used as materials for electronic parts, lubricants, adhesives and so on. Realization of the ability to provide a polyvinyl ether with a reactive silicon-containing functional group, such as silyl group or siloxy group, at the terminal thereof, can be expected to lead to the creation of a variety of novel functional materials, by combining another compound (molecule) with the polyvinyl ether via such functional group or by replacing the functional group with another functional group. However, no concrete means are available for obtaining such a polyvinyl ester. More specifically, although there have hitherto proposed polymerization reactions of various types of vinyl ethers using a Lewis acid, in the broad sense of the word including protonic acids, carbonyl ion salts, metal halides and the like, no examples are found expressly reporting on a polymer having a functional group such as silyl group or siloxy group at the terminal thereof.

As a relevant polymerization including polymerization of a vinyl ether, there can be cited a cationic polymerization in which chlorosilane and a metal halide ($Hg_2Cl_2$) are used (Kageura et al., J. Polym. Sci., 11, 1109 (1972)). In the process described in this paper, no reference is made to the terminal of the polymer. Furthermore, use of the chlorosilane encounters a handling problem because chlorosilane easily decomposes due to hydrolysis, thereby producing hydrochloric acid. More specifically, while a hydrosilane having functional groups such as one to three alkyl groups attached to the silicon atom has good handling property in a polymerization reaction, it exhibits a polymerization activity only when activated with a transition metal catalyst.

Examples of the polymerization reactions of vinyl ethers using a hydrosilane activated by a transition metal catalyst are very few and found only in a report in which a cobalt complex (dicobalt octacarbonyl) is used (Crivello et al., J. Polym. Sci. A., 30, 31-39 (1992)), and in a patent application relating to an invention of a polymerization catalyst primarily composed of platinum for vinyl ethers (Japanese Patent Application Publication No. 17244/1994).

The paper of Crivello et al. relates to a polymerization process including an isomeric reaction of an allyl ether to a vinyl ether. With regard to the polymerization of the vinyl ether, while the molecular weight and molecular weight distribution of the polymer produced are set out, only one working example is given and no elucidation is found regarding the molecular structure of the polymer, including its terminal structure. In the above-mentioned patent application, nothing whatsoever is said regarding either the terminal structure of the polymer or the molecular weight and the molecular weight distribution of the polyvinyl ether.

The object of the present invention is to provide a polyvinyl ether having a silicon-containing functional group or atomic group, such as silyl group or siloxy group, at the terminal thereof and also a method for producing such polyvinyl ether as a novel polyvinyl ether.

DISCLOSURE OF THE INVENTION

The present inventors previously achieved inventions relating to the production of a polyether by the polymerization of a cyclic ether and also the production of a silalkylenesiloxane by the polymerization of a cyclic siloxane, using a catalyst composed of a polynuclear ruthenium-carbonyl complex, a new type of polymerization catalyst which is totally different from the conventional polymerization catalysts (Japanese Patent Application Publication No. 59021/2001: PCT/JP00/07531).

The present inventors have made continued studies and accomplished the present invention based on a surprising finding that the polynuclear ruthenium-carbonyl complex when used in combination with a specific silane compound serves as a highly-active catalyst for the polymerization of a general type of (i.e. non-cyclic) vinyl ether as well as that of the cyclic vinyl ether, thereby enabling the production of the above-mentioned objective polyvinyl ether.

Thus, according to the present invention, there is provided a polyvinyl ether composed of a repeating unit represented by the following formula (I) and having a hydrogen atom at one terminal thereof and a silicon-containing functional group or atomic group represented by the following formula (II) at the other terminal thereof:

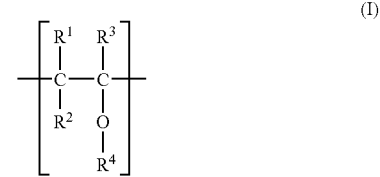

In the formula (I), $R^1$, $R^2$ and $R^3$ are the same or different and each independently represents a hydrogen atom or a hydrocarbon group having 1 to 8 carbon atoms and $R^4$ represents an alkyl group, a cycloalkyl group, an aryl group, an aralkyl group or a silyl group.

In the formula (II), $X^1$, $X^2$ and $X^3$ are the same or different and each independently represents a hydrogen atom, a halogen atom, an amino group, an alkyl group, an alkoxy group, a thioalkyl group, an alkylamino group, an aryl group, an arylamino group, an aralkyl group, a vinyl group, or a heterocyclic group.

According to the present invention, there is also provided a method for preparing the above-mentioned polyvinyl ether, which comprises allowing, in the presence of a catalyst composed of a polynuclear ruthenium-carbonyl complex in which carbonyl groups coordinate with two to four ruthenium atoms, a vinylether compound expressed by the following formula (III)

(III)

(wherein $R^1$, $R^2$ and $R^3$ are the same or different and each independently represents a hydrogen atom or a hydrocarbon group having 1 to 8 carbon atoms, and $R^4$ represents an alkyl group, a cycloalkyl group, an aryl group, an aralkyl group, a silyl group or a substituted derivative thereof)

to react with a silane compound expressed by the following formula (IV):

(IV)

(wherein $X^1$, $X^2$ and $X^3$ are the same or different and each independently represents a hydrogen atom, a halogen atom, an amino group, an alkyl group, an alkoxy group, a thioalkyl group, an alkylamino group, an aryl group, an arylamino group, an aralkyl group, a vinyl group, or a heterocyclic group).

The most preferred polynuclear ruthenium-carbonyl complex as the catalyst is a tri-nuclear ruthenium-carbonyl complex selected from among those expressed by the following formulae (V) and (VI), which contain coordinating acenaphthylene and coordinating azulene, respectively.

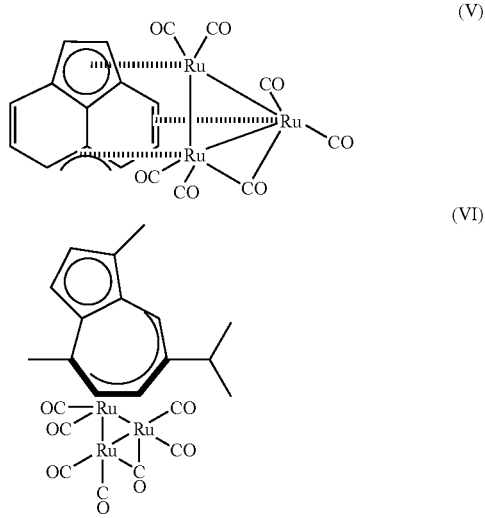

(V)

(VI)

BEST MODE FOR CARRYING OUT THE INVENTION

Figure 1:
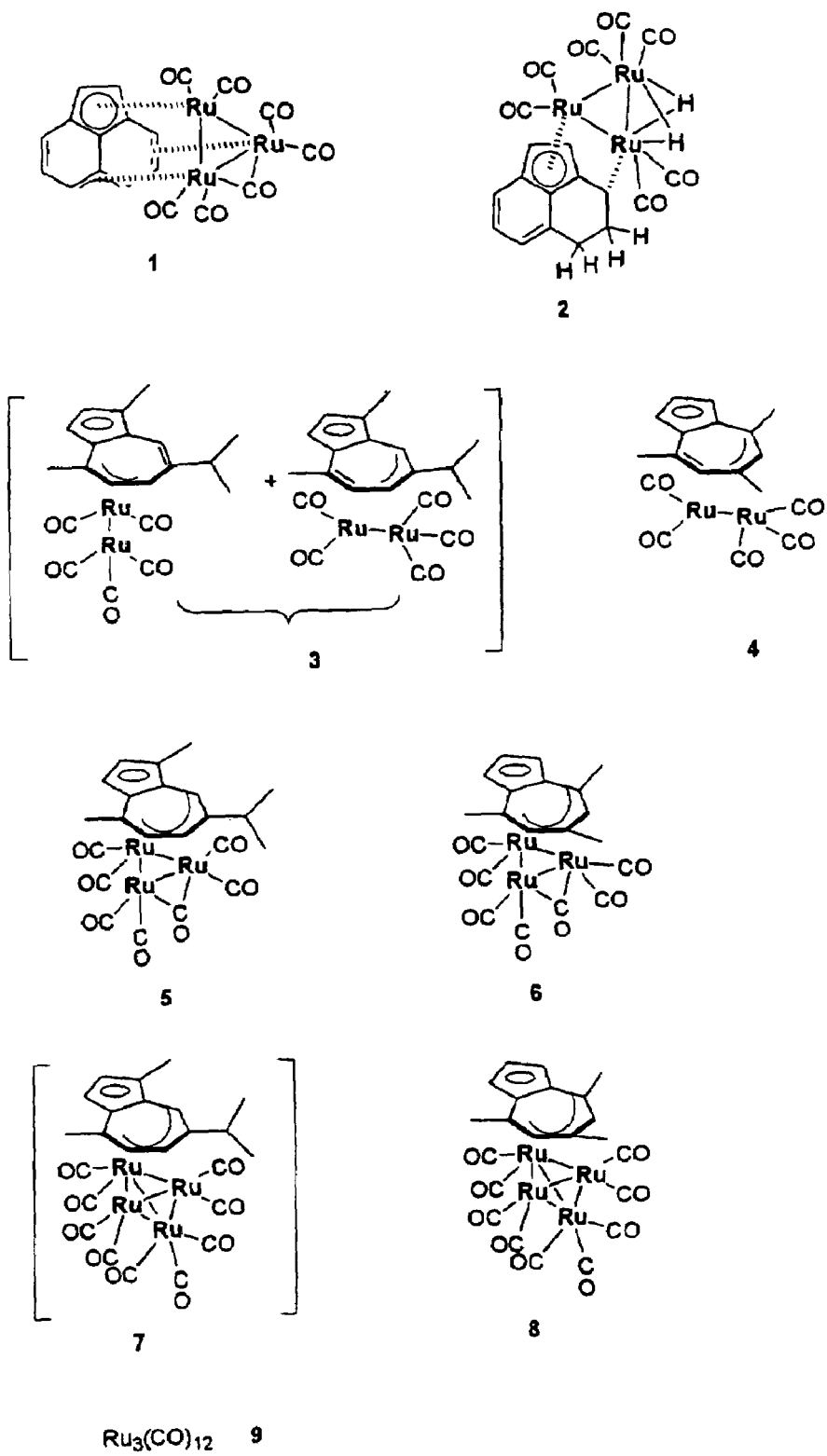
FIG. 1 shows examples of the polynuclear ruthenium carbonyl complex for use as a catalyst in the present invention.

In FIG. 1 there are exemplified polynuclear ruthenium carbonyl complexes, for use as a catalyst in the present invention, in which carbonyl groups coordinate with two to four ruthenium atoms. Such a polynuclear ruthenium carbonyl complex serves as a catalyst for the polymerization of the vinylether compound, in the presence of the silane compound, to produce the polyvinyl ether having a silicon-containing functional group at the terminal thereof, in which the polynuclear ruthenium carbonyl complex catalyst is advantageous over cobalt carbonyl complex catalysts such as $Co_2(CO)_8$ and platinum catalysts such as $H_2PtCl_6 \cdot 6H_2O$, the conventionally well known polymerization catalysts, in that it exhibits a higher activity even in a low catalyst concentration while producing polymers with a narrow molecular weight distribution (cf. the working examples to be described later).

Particularly excellent and efficient catalysts for the polymerization reaction of the vinyl ether compound in the presence of the silane compound are tri-nuclear ruthenium-carbonyl complexes as expressed by the formula 1 in FIG. 1 (the aforementioned formula (V)) and by the formula 5 in FIG. 1 (the aforementioned (VI)), containing coordinating acenaphthylene and coordinating azulene, respectively. The promotion of the production of the polyvinyl ether having a silicon-containing functional group at the terminal thereof, by such polynuclear ruthenium carbonyl complex, is presumably due to a structural change of the coordinating acenaphthylene or azulene forming a conjugated π-electron system, which may cause displacement of the Ru atoms thereby facilitating the introduction of Si atoms into the reaction system (Matsubara et. al., Organometallics, 21, 3023-3032 (2003)). By contrast, there is no such coordinating acenaphthylene or azulene in the aforementioned cobalt carbonyl compound or platinum compound.

According to the present invention in which the polymerization is carried out with the above-mentioned polynuclear ruthenium carbonyl compound as the catalyst in the presence of the silane compound, it is possible to produce the polyvinyl ether having a silicon-containing functional group or atomic group from a variety of known or available vinyl ether compounds.

Thus, in the aforementioned formula (III) which expresses the starting monomer, $R^1$, $R^2$ and $R^3$ are generally a hydrogen atom but may each independently be selected from among a hydrogen atom and a hydrocarbon group having 1 to 8 carbon atoms. The hydrocarbon groups having 1 to 8 carbon atoms may include alkyl groups, aryl groups and aralkyl groups in which an alkyl group having 1 to 5 carbon atoms is particularly preferred.

In the formula (III), $R^4$ represents an alkyl group, a cycloalkyl group, an aryl group, an aralkyl group or a silyl group, in which such functional groups may be substituted. The number of carbon atoms in the alkyl group, the cycloalkyl group, the aryl group or the aralkyl group is generally, but is not limited to, in the range of 1 to 10. The examples of $R^4$ include, but are not limited to, methyl group, ethyl group, n-propyl group, isopropyl group, n-butyl group, isobutyl group, n-octyl group, cyclohexyl group, phenyl group, benzyl group, 2-ethoxyethyl group, phenoxyethyl group, 2-chloroethyl group, trimethylsilyl group, and triethylsilyl group.

In preparing the polyvinyl ether having a silicon-containing functional or atomic group in accordance with the present invention, there can be used a variety of known or available silane compounds. Thus, in the formula (IV) which expresses the silane compound, X1, X2 and X3 are the same or different and each independently represents a hydrogen atom, a halogen atom, an amino group, an alkyl group, an alkoxy group, a thioalkyl group, an alkylamino group, an aryl group, an arylamino group, an aralkyl group, a vinyl group, or a heterocyclic group. The number of carbon atoms in such groups is generally, but is not limited to, 1 to 18. A preferable example of the heterocyclic group is piridyl group.

According to the present invention, by allowing, in the presence of a catalyst composed of a polynuclear ruthenium-carbonyl complex such as those expressed by the formula (V) or (VI), the vinyl ether compound to react with the silane compound as mentioned above, there can be prepared the polyvinyl ether composed of a repeating unit represented by the aforementioned formula (I) and having a hydrogen atom at one terminal thereof and a silicon-containing functional or atomic group represented by the aforementioned formula (II) at the other terminal thereof. More specifically the polyvinyl ether thus prepared can be expressed by the following formula (VII):

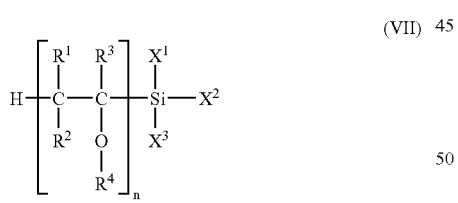

For $R^1$, $R^2$ and $R^3$ in the formulae (I) and (VII) and for $X^1$, $X^2$ and $X^3$ in the formulae (II) and (VII), the same definitions are applied to the same symbolic letters as made with respect to the formulae (III) and (IV).

The molecular weight of the polyvinyl ether prepared in accordance with the present invention is not restricted, but is generally in the range of approx, 500 to 500,000 as number-average molecular weight measured by GPC (gel permeation chromatography). Thus, n in the formula (VII) expresses a number (integer) corresponding to such molecular weight.

Therefore, the overall reaction scheme for the preparation of the polyvinyl ether according to the present invention can be expressed by the following reaction formula (VIII):

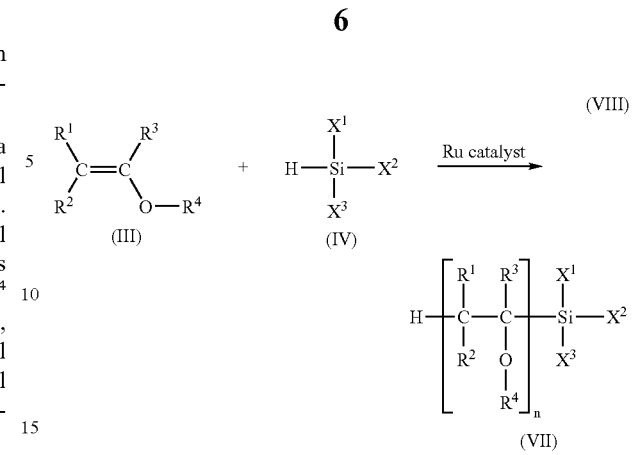

The reaction for the preparation of the polyvinyl ether according to the present invention, as expressed by the formula (VIII), can be carried out under a mild condition, i.e. at atmospheric pressure at a temperature of 5 to 90° C. The reaction can be done either by a solution polymerization or by a bulk polymerization, between which the solution polymerization is more preferred. Examples of solvents suitable for use in the solvent polymerization include 1,4-dioxane, Tetrahydropyran, diethyl ether, tert-butyl methyl ether, and toluene. While the reaction time depends upon such factors as the reaction temperature and the catalyst concentration, it is generally in the range of one minute to four hours.

EXAMPLES

While there are provided working examples below in order to more clearly define the features of the present invention, the present invention is not in any respect limited by the working examples. Throughout the present specification and the drawings, Me denotes methyl group, Et denotes ethyl group, Ph denotes phenyl group, Mn denotes number-average molecular weight, Mw denotes weight-average molecular weight, and GPC denotes gel permeation chromatography.

Example 1

Syntheses of Polyvinyl Butyl Ether and Other Materials

Figure 2:
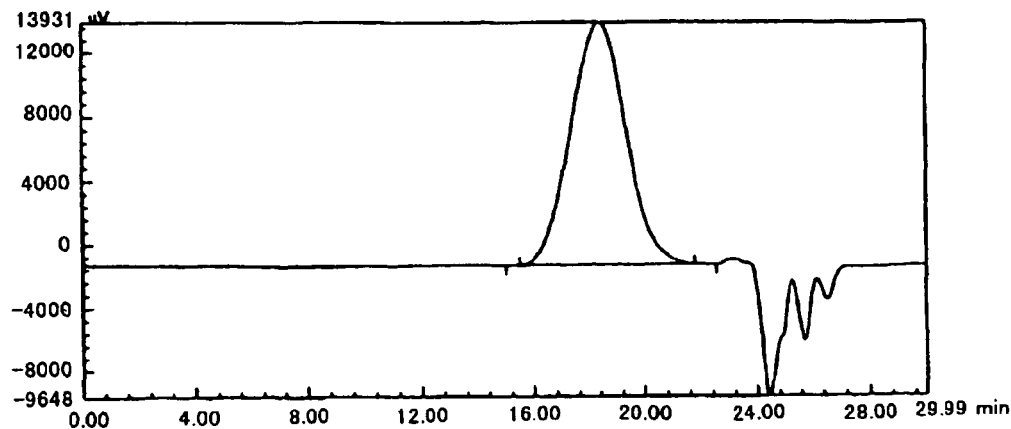
FIG. 2 shows an example of a GPC chart obtained with respect to a polyvinyl ether prepared in accordance with the present invention.

Into a 30 ml round-bottom flask with two necks equipped with a three-way cock, in which the air had been replaced with nitrogen gas, there were added 2.15 mg ($3.3 \times 10^{-3}$ mmol) of acenaphthylene heptacarbonyl ruthenium (the polynuclear ruthenium-carbonyl complex as expressed by the formula (V): hereinafter sometimes referred to simply as the "Ru complex") as the catalyst, 0.05 ml of 1,4-dioxane as the solvent, and 0.050 ml (0.33 mmol) of dimethylphenylsilane (HSiMe$_2$Ph) as the silane compound. After stirring at room temperature (25° C.) for thirty minutes, there was added 0.43 ml (3.3 mmol) of tert-butyl vinyl ether (tBuVE) as the vinyl ether compound. The resultant solution was stirred at room temperature for ten minutes, and then the 1,4-dioxane and the excess phenyldimethyl silane were distilled off. Into the residual viscous liquid was dissolved in 2 ml of hexane. Following the addition of methanol 6 ml, the resultant white deposit was subjected to drying in vacuo, to yield a white solid material, 277 mg (92%). The molecular weight of the white solid material was determined by GPC, and the material was also subjected to the measurement of IR, $^1$H and $^{13}$C NMR spectra. FIG. 2 shows the GPC chart. The assignment of the IR and NMR data are summarized below. From these results the white solid material was identified to be polyvinyl tert-butyl ether.

IR spectrum (KBr): 2979, 1474, 1389, 1362, 1253, 1230, 1195, 1105, 1059, 1006 cm$^{-1}$.

$^1$H NMR spectrum: in $C_6D_6$, inner reference $C_6H_6$,

δ (ppm) 1.35(br, tBu), 1.96(br, $CH_2$), 3.88(br, CH).

$^{13}$C NMR spectrum: in $C_6D_6$, inner reference $C_6H_6$,

δ (ppm) 29.7(($CH_3$)$_3$C), 46.1(($CH_3$)$_3$C), 66.9, 67.5, 68.1($CH_2$), 72.8, 73.1, 73.4(CH).

Isobutyl vinyl ether (iBuVE), n-butyl vinyl ether (nBuVE), or isopropyl vinyl ether (iPrVE) was used instead of tert-butyl vinyl ether (tBuVE) as the starting monomer (the vinyl ether compound). The polymerization reactions and the characterization of the formed polymer were carried out in the same manner as mentioned above. The results are summarized in Table 1.

Example 2

Comparison with Other Types of Catalysts

The polynuclear ruthenium-carbonyl complex catalyst according to the present invention was compared with the conventionally proposed cobalt complex catalyst and the platinum complex catalyst with respect to catalyst performance for the polymerization reaction of the vinyl ether. The polynuclear ruthenium-carbonyl complex catalyst was the same Ru catalyst as used in Example 1, while the cobalt complex catalyst was $Co_2(CO)_8$ and the platinum complex catalyst was $H_2PtCl_6 \cdot 6H_2O$. The procedure of the reactions and the analysis of products were made in the same manner as in Example 1. The polymerization reactions were carried out at room temperature with tBuVE as the monomer (the starting vinyl ether) and $HSiMe_2Ph$ as the silane compound in which the ratio of the monomer to the silane was 10:1. The results are summarized in Table 2.

TABLE 2

| Complex | Catalyst (mol %) | Reaction Time (hr) | Conversion (%) | Yield (%) | Mn | Mw/Mn |
|---|---|---|---|---|---|---|
| Ru Complex* | 0.1 | 0.02 | 95 | 85 | 9000 | 1.2 |
| Ru Complex* | 0.01 | 4 | 84 | 75 | 7000 | 2.3 |
| $Co_2(CO)_8$** | 0.1 | 0.1 | 100 | 84 | 7000 | 2.8 |
| $Co_2(CO)_8$** | 0.01 | 24 | No reaction | Unmeasurable | Unmeasurable | Unmeasurable |
| $H_2PtCl_6 \cdot 6H_2O$*** | 0.1 | 1 | Unmeasurable | <10 | Unmeasurable | Unmeasurable |
| $H_2PtCl_6 \cdot 6H_2O$*** | 0.01 | 24 | No reaction | Unmeasurable | Unmeasurable | Unmeasurable |

*Solvent: THP (20 mol %)
**Solvent: None
***Solvent: EtOH (20 mol %)

TABLE 1

| Run No. | monomer | Reaction time (min.) | Mn | Mw/Mn | Conversion (%) | Yield (%) |
|---|---|---|---|---|---|---|
| 1 | iBuVE | 60 | 10000 | 2.7 | 95 | 98 |
| 2 | tBuVE | 10 | 9000 | 1.4 | 96 | 92 |
| 3 | nBuVE | 120 | 12000 | 2.1 | 96 | 82 |
| 4 | iPrVE | 20 | 10000 | 2.8 | 100 | 69 |

Monomer/Silane = 10:1
Catalyst Concentration: 0.1 mol %

As shown in Table 1, all of the monomers (alkyl vinyl ethers) produced a polymer (polyvinyl ether) with a narrow molecular weight distribution (a low Mw/Mn).

As shown in Table 2, the ruthenium complex used in the present invention is very advantageous over the cobalt complex and the platinum complex in that it is more reactive for the vinyl ether polymerization reaction thus producing, at a lower catalyst concentration, the polyvinyl ether even with a narrow molecular weight distribution.

Example 3

Studies on Reaction Conditions

The polymerization reactions of iBuVE (isobutyl vinyl ether) were carried out using the Ru catalyst in the presence of $HSiMe_2Ph$ as the silane compound in the same manner as in Example 1, at varying monomer (the vinyl ether compound)/silane (the silane compound) ratio and reaction temperature. The results are summarized in Table 3.

TABLE 3

| Run No. | Monomer/ Silane | Catalyst Concentration (mol %) | Reaction Temperature (° C.) | Reaction Time (min.) | Mn | Mw/Mn | Conversion (%) | Yield |
|---|---|---|---|---|---|---|---|---|
| 1 | 1:0.01 | 0.1 | 23 | 180 | 29000 | 6.5 | 24 | 36 |
| 2 | 1:0.1 | 0.1 | 23 | 60 | 10000 | 2.7 | 95 | 98 |
| 3 | 1:1 | 0.1 | 23 | 60 | 2000 | 2.1 | 91 | 61 |

TABLE 3-continued

| Run No. | Monomer/ Silane | Catalyst Concentration (mol %) | Reaction Temperature (° C.) | Reaction Time (min.) | Mn | Mw/Mn | Conversion (%) | Yield |
|---|---|---|---|---|---|---|---|---|
| 4 | 1:0.1 | 0.1 | 60 | 40 | 6500 | 3.4 | 99 | 82 |
| 5 | 1:0.1 | 0.1 | 80 | 40 | 4800 | 3.4 | 98 | 90 |

As can be seen from Table 3, it is possible to control the molecular weight and molecular weight distribution of the product polymer by varying the monomer/silane ratio and the reaction temperature. For example, there can be obtained a polymer which has a relatively small molecular weight but has a narrower molecular weight distribution (lower Mw/Mn), by increasing the amount of the silane relatively over the monomer (the starting vinyl ether). It is also possible to produce a polymer having a larger molecular weight by lowering the reaction temperature.

The polymerization reactions were further carried out in the same manner using different types of the silane (the silane compound). The results are summarized in Table 4. The monomer (the starting vinyl ether) was tBuVE for Run No. 6 and iBuVE for the other Runs.

TABLE 4

| Run No. | Silane | Reaction Time (min.) | Mn | Mw/Mn | Conversion (%) | Yield (%) |
|---|---|---|---|---|---|---|
| 1 | HSiMe$_2$Ph | 60 | 10000 | 2.7 | 95 | 98 |
| 2 | HSiMe$_2$Et | 1 | 22000 | 3.4 | 98 | 96 |
| 3 | HSiMeEt$_2$ | 5 | 13000 | 2.8 | 95 | 85 |
| 4 | (HSiMe$_2$CH$_2$)$_2$ | 120 | 4000 | 2.8 | 90 | 57 |
| 5 | HSi(OEt)$_3$ | 480 | 13000 | 2.5 | 100 | 78 |
| 6 | HSiMe$_2$(CH=CH$_2$) | 240 | 22000 | 1.6 | 92 | 78 |

Monomer/Silane=10:1,

Reaction Temperature: Room Temperature

Catalyst Concentration: 0.1 mol %

As can be seen from Table 4, according to the present invention in which the Ru complex was used as the catalyst, the vinyl ether polymerization reaction proceeded efficiently with all types of the silane compounds. The product polymers had a narrow molecular weight distribution with a Mn/Mn value of approx. 1.5 to 3.0, including the polymer with the extremely low value of 1.5 when tBuVE was used.

Example 4

Analysis of the Terminal of the Polymers

In order to study the terminal structure of the polymers prepared as above, the product of Run No. 3 in Example 3 (the starting monomer: iBuVE, the silane: HSiMe$_2$Ph, monomer/silane=1:1, Mn=2000) was taken as a representative to be subjected to NMR analysis.

Figure 3:
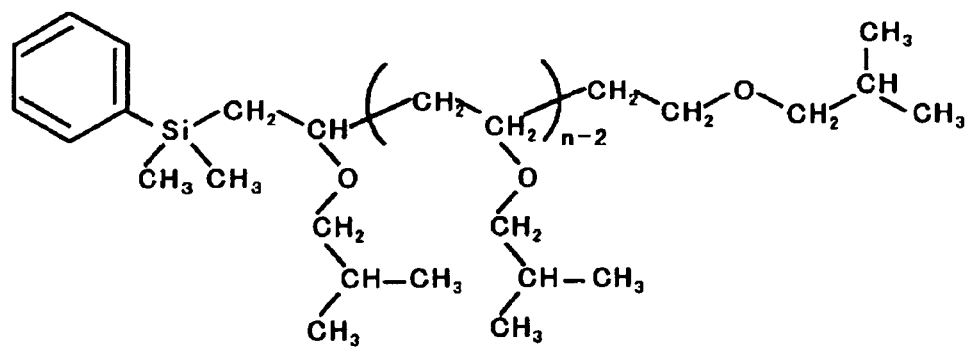
FIG. 3 shows the chemical formula of a polyvinyl ether prepared in accordance with the present invention, together with a corresponding schematic formula from which NMR data can be assigned to the respective positions of the molecule.
Figure 3:
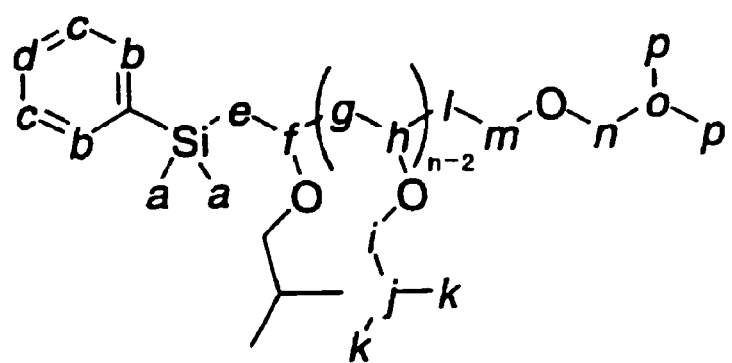
Figure 4:
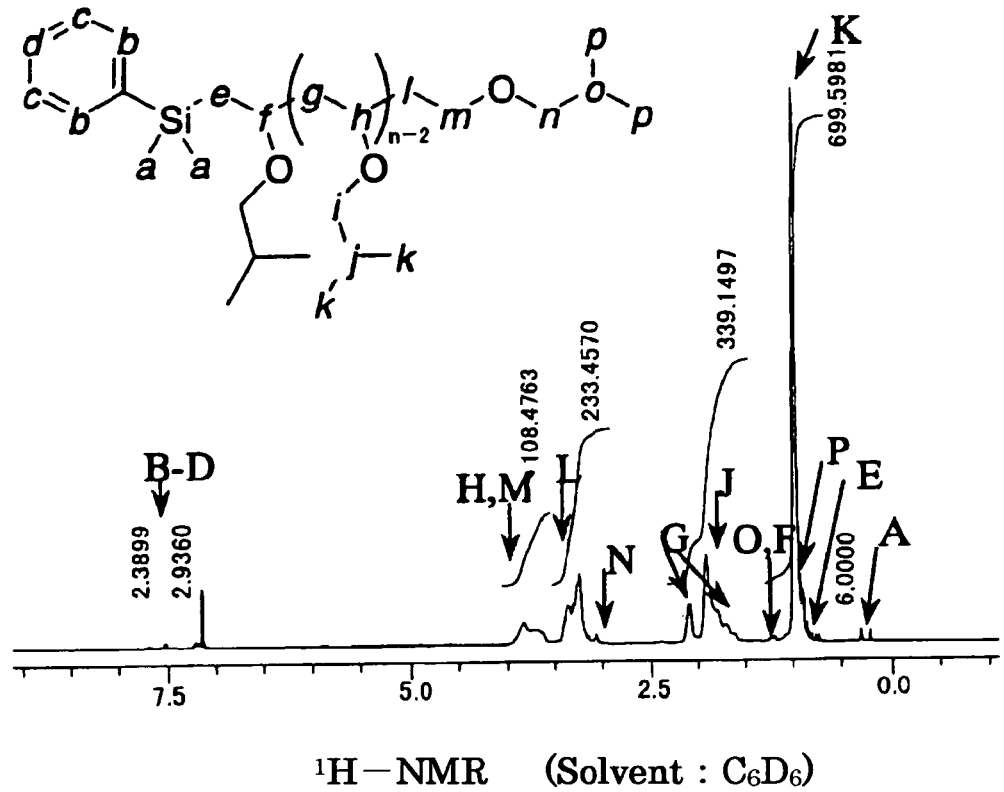
FIG. 4 shows an example of an $^1H$ NMR spectrogram of a polyvinyl ether prepared in accordance with the present invention.
Figure 5:
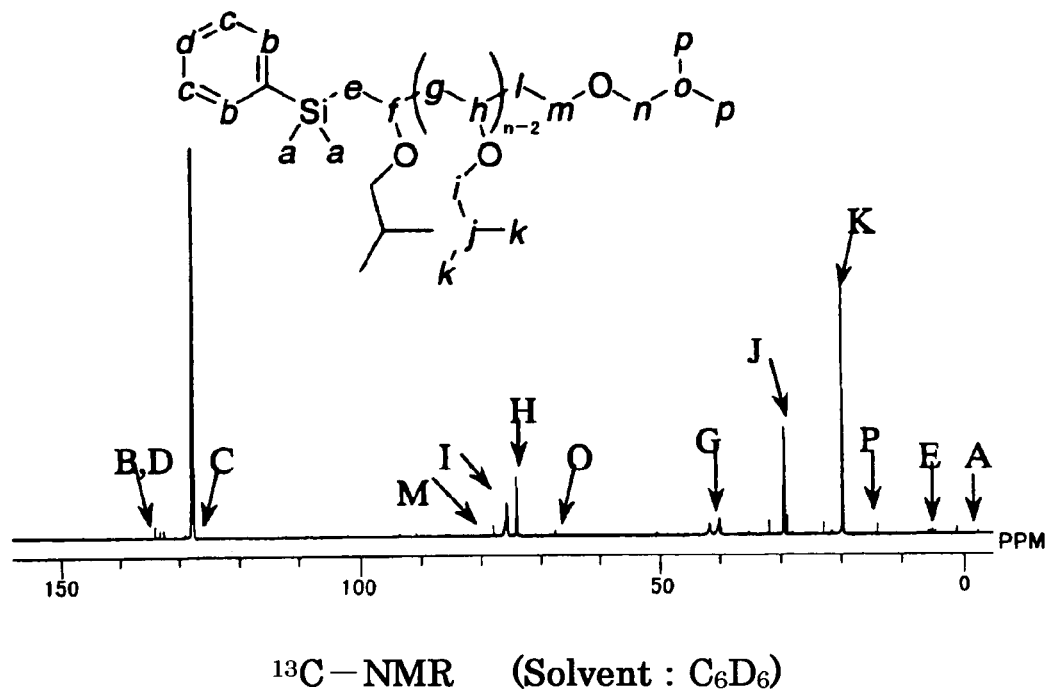
FIG. 5 shows an example of a $^{13}C$ NMR spectrogram of a polyvinyl ether prepared in accordance with the present invention.

The NMR data are given below. In addition, FIG. 3 shows the chemical formula of the product polymer (the polyvinyl ether), at the upper part of the figure, as well as a schematic structure of such polymer, at the lower part of the figure, from which the NMR data can be assigned to the respective hydrogen atoms and carbon atoms. FIG. 4 shows the $^1$H NMR spectrogram while FIG. 5 shows the $^{13}$C NMR spectrogram. The respective positions denoted by the capital alphabetical letters in FIG. 4 and FIG. 5 correspond to the respective positions denoted by the small alphabetical letters in the formula shown in FIG. 3.

$^1$H NMR (C$_6$D$_6$, rt): δ 0.3(s, 6H, Ha), 7.55(d, 2H, Hb), 7.20(m, 3H, Hc and Hd), 0.7-0.8(doublets, 2H, He), 1.2(m, 1H, Hf), 1.6-2.1(br, Hg), 3.6-3.8(br, Hh), 3.0-3.4(br, Hi), 1.9(m, Hj), 0.99(brs, Hk), 3.4(t, 2H, Hm), 3.0(d, 2H, Hn), 1.2(m, 1H, Ho), 0.9(d, 6H, Hp).

$^{13}$C NMR(C$_6$D$_6$, rt): δ −2.7(Ca), 134(Cb), 128(Cc), 131(Cd), 136(ipso-PhSi), 4.9-6.0(Ce), 39-42(Cg), 74(Ch), 76(Ci), 29(Cj), 20(Ck), 78(Cm), 67(Cn), 14(Cp).

Thus, from the $^1$H NMR and $^{13}$C NMR spectral data it is evidenced that the product polymer is composed of the repeating units of iso-butyl ether group corresponding to the starting monomer and has a hydrogen atom at one terminal thereof and PhMe$_2$Si group corresponding to the silane at the other terminal thereof.

Figure 6:
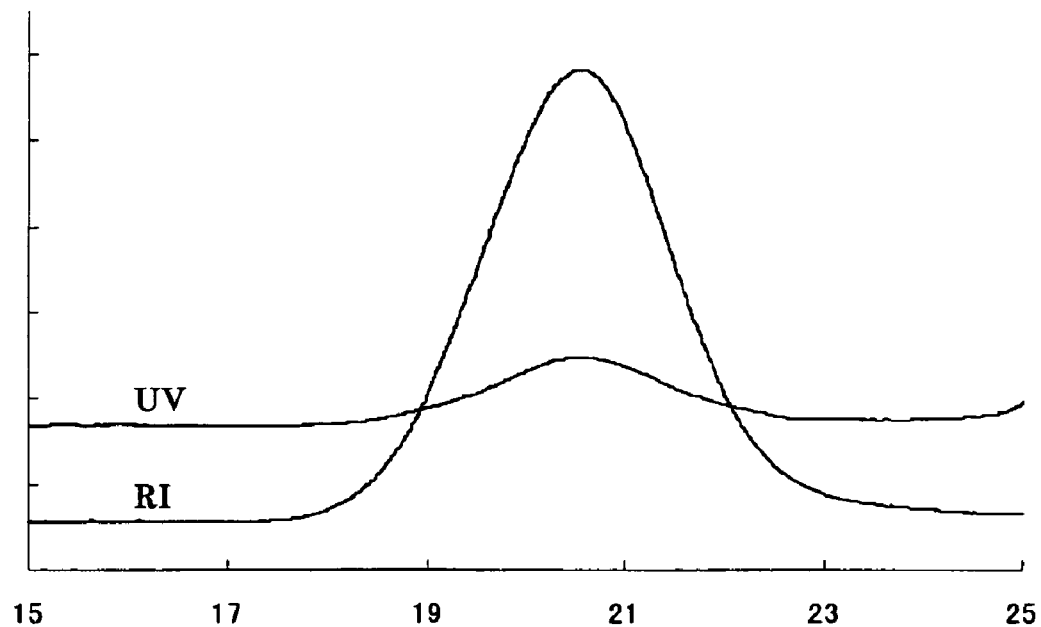
FIG. 6 shows an example of a GPC chart of the polymer synthesized in accordance with the present invention using a silane having a phenyl group.
Figure 7:
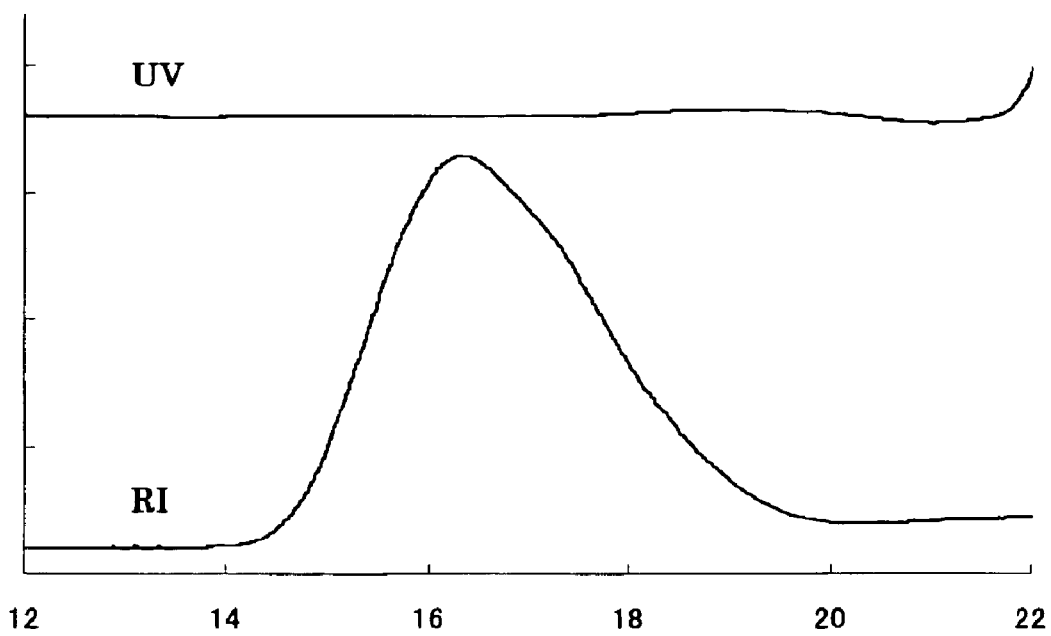
FIG. 7 shows an example of a GPC chart of the polymer synthesized using a silane not having a phenyl group.

The terminal structure of polyvinyl isobutyl ether prepared in accordance with the present invention was also ascertained via GPC. It is known that, in the case of a polymer having an UV-reactive substituent such as phenyl group within the repeating unit, the GPC profile detected by UV detector resembles to that by RI detector. GPC data for the polymer synthesized from the silane having a phenyl group bound was therefore compared with GPC data for the polymer synthesized from the silane not having phenyl group. As a result, it was ascertained that, only for the polymer from the phenyl group-containing silane, the GPC profile detected by UV detector resembles that by RI detector. FIG. 6 shows the GPC chart of the polymer synthesized from the silane having a phenyl group, whereas FIG. 7 shows the GPC chart of the polymer from the silane not having phenyl group.

INDUSTRIAL UTILIZABILITY

The present invention realizes, for the first time, the synthesis of polyvinyl ether having a reactive silicon-containing functional or atomic group at the terminal thereof. The polyvinyl ether obtained in accordance with the present invention will contribute to the development of novel materials with new characteristics, as it is easy to bind the polymer with another type of compound (molecule) by modifying the reactive silicon-containing functional or atomic group thereof to another type of functional group. The present invention is also of great significance in that it enables the production of polymers with a narrow molecular weight distribution, which is one of the highly demanded properties for a polymer for industrial use

What is claimed is:

1. A polyvinyl ether composed of a repeating unit represented by the following formula (I) and having a hydrogen atom at one terminal thereof and a silicon-containing functional group or atomic group represented by the following formula (II) at the other terminal thereof:

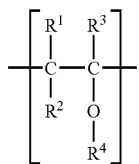

wherein $R^1$, $R^2$ and $R^3$ are the same or different and each independently represents a hydrogen atom or a hydrocarbon group having 1 to 8 carbon atoms and $R^4$ represents an alkyl group, a cycloalkyl group, an aryl group, an aralkyl group, a silyl group, or a substituted derivative thereof

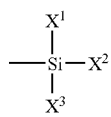

wherein $X^1$, $X^2$ and $X^3$ are the same or different and each independently represents a hydrogen atom, a halogen atom, an amino group, an alkyl group, an alkoxy group, a thioalkyl group, an alkylamino group, an aryl group, an arylamino group, an aralkyl group, a vinyl group, or a heterocyclic group.

2. A method for preparing the polyvinyl ether as defined by claim 1, which comprises allowing, in the presence of a catalyst composed of a polynuclear ruthenium-carbonyl complex in which carbonyl groups coordinate with two to four ruthenium atoms, a vinylether compound expressed by the following formula (III) to react with a silane compound expressed by the following formula (IV):

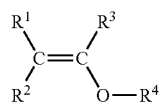

wherein $R^1$, $R^2$ and $R^3$ are the same or different and each independently represents a hydrogen atom or a hydrocarbon group having 1 to 8 carbon atoms, and $R^4$ represents an alkyl group, a cycloalkyl group, an aryl group, an aralkyl group, a silyl group or a substituted derivative thereof

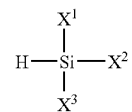

wherein $X^1$, $X^2$ and $X^3$ are the same or different and each independently represents a hydrogen atom, a halogen atom, an amino group, an alkyl group, an alkoxy group, a thioalkyl group, an alkylamino group, an aryl group, an arylamino group, an aralkyl group, a vinyl group, or a heterocyclic group.

3. A method of preparing the polyvinyl ether as defined by claim 2, in which the polynuclear ruthenium-carbonyl complex is a tri-nuclear ruthenium-carbonyl complex selected from among those expressed by the following formulae (V) and (VI), which contain coordinating acenaphthylene and coordinating azulene, respectively

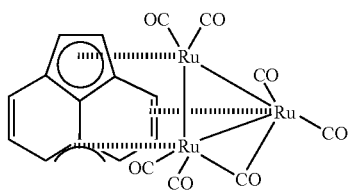

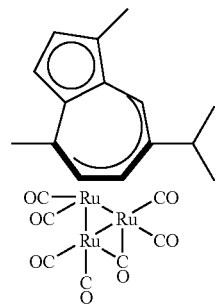

* * * * *